March 8, 1966 W. D. COHEN 3,239,159

TAPE-COLLECTING REEL

Filed Feb. 19, 1963 2 Sheets-Sheet 1

*INVENTOR.*

William D. Cohen

*BY* S.C. Yuter

ATTORNEY

March 8, 1966 W. D. COHEN 3,239,159

TAPE-COLLECTING REEL

Filed Feb. 19, 1963 2 Sheets-Sheet 2

INVENTOR.

William D. Cohen

BY

S. C. Yuter

ATTORNEY

United States Patent Office 3,239,159

Patented Mar. 8, 1966

3,239,159

TAPE-COLLECTING REEL

William D. Cohen, Syosset, N.Y., assignor to Digitronics Corporation, Albertson, N.Y., a corporation of Delaware Filed Feb. 19, 1963, Ser. No. 259,596
8 Claims. (Cl. 242—71.8)

This invention relates to collecting reels for collecting and storing magnetic tape, for example, such as is used on computers or the like, with the reel constructed to permit easy removal of one side wall to provide access for removing the accumulated roll of tape from the reel in its rolled up condition.

In dealing with a length of tape, it is frequently desirable to accumulate the tape as a roll starting from one end or the other and then to easily remove the tape as so rolled for storage or for other purposes. To provide easy access to an accumulated tape when it is on the collecting reel, it is necessary that the reel be so constructed as to permit it to be separated into two parts or split to enable the accumulated roll of tape to be removed axially from the supporting elements on which the tape is accumulated on the reel. Since time is an important factor in handling such equipment for the placing or removal of tapes, an important factor in the construction of such a reel is that it may be easily separated or split to remove a tape and then easily reassembled for immediate re-use for accumulating another tape.

The main object of the invention is to provide a split reel assembly which may be easily and readily assembled to receive and wind a tape thereon, and subsequently to be easily and readily disassembled to permit a wound tape to be easily removed from the reel.

A split reel assembly made in accordance with the principles of this invention is formed by combining two disc plates that are to serve as the end walls of the reel on a supporting cylindrical hub which is to be suitably coupled to a drive shaft in order to enable driving energy from the shaft to be imparted to the reel for driving the reel and rotating it in the direction controlled by the direction of rotation of the drive shaft. The two annular discs that are to serve as the end walls of the reel are arranged to be spaced apart an appropriate distance to accommodate the width of the tape that is to be wound thereon, while at the same time providing both supporting and locking means to hold the two annular discs coaxially fixed in predetermined spaced relation. In order to provide the spacing desired, a set of spacing elements are disposed and anchored on one of the discs and extend coaxially parallel to locate the front ends of those spacing posts in plane to define the location of the second annular disc.

The second annular disc is provided with keyhole slots, preferably symmetrically disposed with respect to the axis of the reel at appropriate locations to fit over guide-pin locking heads on the front ends of the spacing posts anchored to the other disc. When the second disc is appropriately positioned to fit the keyholes over the heads of the spacing posts, and the second disc is then turned through a short angle to move the slots under the head-shaped guide elements on the spacing posts, the second disc is held against axial displacement from the guide posts. That second annular disc is then locked in such position by a biassed depressable pin which is biassed forward to enter an appropriately positioned hole in that second disc so that the biassed pin serves to prevent reverse angular turning of the second disc to a position which would permit axial removal of that disc from the guide head pins on the positioning posts.

A further feature of the invention resides in a frictional coupling arrangement between a drive shaft and the hub of the reel, which permits the coupling to be quickly adjusted to drive position or to release position, for quickly coupling the reel to the drive shaft or for decoupling the reel from the drive shaft to permit the reel to be removed completely from the drive shaft, with or without the tape wound on the reel.

Another feature of the invention is the construction of the reel with spacing posts disposed between the two side walls of the reel and arranged to serve as supporting elements for the tape to be wound thereon, with the spacing posts defining the locus of a winding circle of predetermined expanded diameter when the reel is assembled, and then defining an inner circle of reduced diameter when the reel is split, so that the wound roll of tape may be easily and readily slid off axially from the supporting spacing posts.

A further feature of the invention that permits the foregoing action, is that the placement of the second or outer disc wall plate on the reel to close the reel, serves also to tilt one end of each of the spacing posts radially from its normal position parallel to the axis of the reel, whereby such placement of the outer disc wall in assembling the reel, tilts the spacing elements the slight amount to increase the diameter of the circle defined by those spacing posts, and the subsequent removal of that side wall disc permits the spacing posts to resume their original position where they define a circle of smaller diameter, as a result of which the wound reel of tape may be readily removed from those supporting spacing posts.

Another feature of the invention is the frictional coupling between the drive shaft and the hub of the split reel assembly, whereby one or more rubber-type elements such as O-rings, may be compressed to a slightly larger diameter at which the O-rings will grip the hub of the split reel assembly to establish frictional driving relationship. In the normal position of the O-rings, when not under compression, the external diameter of the O-rings is less than the internal diameter of the hub and no frictional coupling is established, so that the reel may be readily removed from the coupling.

The construction of the split reel assembly on which the tape is to be wound, and the frictional coupling device for driving the reel, are described in more detail in the following specification taken in connection with the accompanying drawings, in which.

Figure 1:
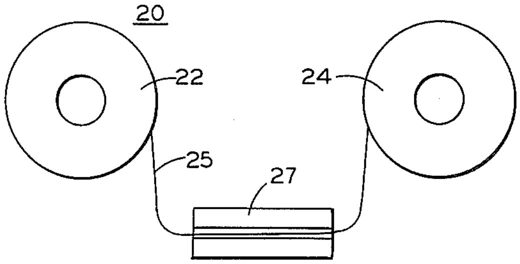
FIGURE 1 is a schematic view showing how a tape may be moved from one operating reel to a storage or accumulating reel, either or both of which may be constructed in accordance with the principles of the invention disclosed herein.

As shown in FIGURE 1, a generalized tape control system 20 is indicated as represented by two reels 22 and 24 between which a tape, for example a magnetic tape 25, is suitably controlled and transported from one reel to the other, by any suitable mechanism represented by the box 27.

Either reel may be a tape-feeding reel or a tape-collecting reel. It is therefore advantageous to have either or both reels constructed in accordance with the present invention in order that the reels may be quickly and readily removed from their driving connections, and also in order that the tape itself, when wound and accumulated on a reel, may be easily and readily removed from the reel, without any frictional hindrance, for storage or other purposes.

Figure 2:
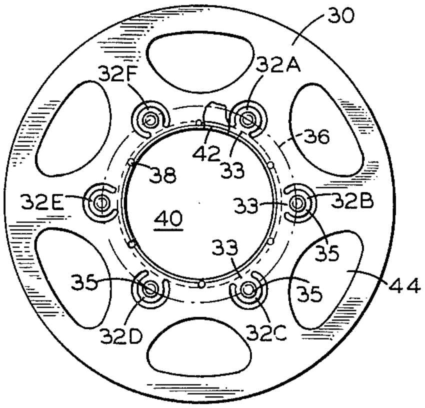
FIGURE 2 is a front elevational view of a fixed flange disc or side wall of the reel as seen on the outside surface of that disc.
Figure 3:
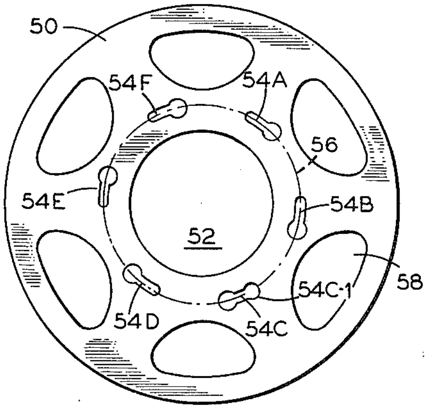
FIGURE 3 is also an elevational view of the other annular disc or side wall which serves as the removable side wall in order to provide access to the wound roll of tape.
Figure 4:
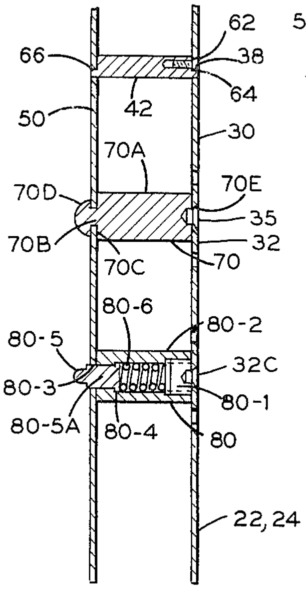
FIGURE 4 is a vertical sectional view of a portion of the reel of the present invention, showing how three elements that extend between the two side walls of the reel are disposed and operate functionally, namely, the hub of the reel, a spacing post, and one of the spacing posts that also serves the purpose of a locking pin.
Figure 4A:
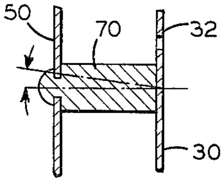
FIGURE 4A is a detailed view of a portion of FIGURE 4 showing how one of the posts therein is tiltable.

In order to achieve these advantages, the reels are constructed as shown in more detail in FIGURES 2, 3 and 4.

A tape reel 22, for example, generally comprises a hub upon which two annular discs or flanges are supported to constitute two side walls between which an annular space is defined to accommodate the tape.

FIGURE 2 shows an elevational view of one flange or end wall 30 and FIGURE 3 shows an elevational view of the other flange or end wall 50.

The annular disc 30 is provided with a series of tabs 32A to 32F respectively, pressed out of the metal of the disc 30 with sufficient clearance to permit the tabs to have a certain amount of free movement relative to a neck portion 33 on each of the tabs. Each tab of the 32-series is also provided with a central opening 35 to receive the anchoring elements of spacing posts and a locking post to be described later. These openings 35 in the several tabs are centrally located on a circular locus line 36 that is concentric with the central axis of the disc. The disc 30 is also provided with a series of holes 38 adjacent the periphery of a bore 40 of disc 30 to receive a series of anchoring screws for securing the disc 30 to a hollow cylindrical hub 42 which serves as the basic supporting element for the disc 30 and the reel structure upon which the tape is to be wound and accumulated.

The several cut-outs 44 shown in the disc 30 serve merely to diminish the weight of the flange and of the final reel, since the reel will normally be driven at relatively high speeds.

The other flange disc 50 shown in FIGURE 3 may now be considered. The flange disc 50 is provided with a central bore 52 of appropriate dimensions to enable that flange disc to seat concentrically and coaxially on the opposite end of the cylindrical hub 42, as will be explained later in the description relating to FIGURE 4. The flange disc 50 is also provided with a series of keyhole slots 54A to 54F disposed on a circular locus 56 concentric with the axis of the disc 50, to enable those keyhole slots 54A to 54F to cooperate with the spacing elements supported on the tabs 32A to 32F of the disc 30 in FIGURE 2, as will be described in connection with the description of FIGURE 4.

The circular locus 56 is of the same diameter as the circular locus 36 in FIGURE 2. The extension slots on the keyholes are substantially arcuately parallel to the circular locus line 56.

In accordance with the invention, one of the keyhole slots, in this case the keyhole slot identified as 54C, differs from the other keyhole slots in the provision of an enlarged circular opening 54C–1 at the end of the narrow slot extending from the keyhole opening. The purpose and function of this enlarged opening 54C–1 is to receive a locking pin which will be referred to and described in connection with FIGURE 4. The disc 50 is provided with several cut-outs 58, also for the purpose of lightening the weight of the reel to reduce the inertia of the reel to permit fast starting and stopping operations.

Reference may now be made to FIGURE 4, which shows a side view of the reel, with certain connecting elements in section to illustrate the manner in which the two flange discs are held in proper relationship to provide the spacing for the tape to be wound thereon, and the manner in which the two discs are locked to prevent casual unintentional separation.

As shown in FIGURE 4, the flange disc 30 is secured to the central hub 42 by a series of drive screws 62 extending through the holes 38 in the disc 30 and into one annular edge of the hub 42. The hub 42 is shown as having a shoulder 64 on which the peripheral edge of the bore will seat in assembly to provide a more rigid construction to the reel when the flange disc 30 is secured in position by those screws 62.

The other end edge of the hub 42 is provided with a similar shoulder 66 onto which the other flange disc 50 may be readily fitted to serve as a guide to establish substantial coaxial assembly of that removable disc 50 onto the hub 42.

Reference may now be made to the spacing posts 70 which serve the purpose of spacing the two flange discs 30 and 50 to the proper dimension, and also serve the purpose of locking the removable flange disc 50 against casual separation and to hold the disc 50 in appropriate planar position.

As shown in FIGURE 4, the spacer post 70 is provided with a body or shank portion 70A, a neck 70B, a shoulder 70C and a head 70D. The spacer post 70 at its lower end is provided with a thin extension 70E which extends through the opening 35 in the associated tab 32. That thin cylindrical extension 70E is then peened over by suitable means such as a pressure ball to anchor the lower end of the spacing post 70 to the tab of the 32-series on which that particular spacing post is being anchored.

The spacing post 70 is relatively cylindrical and the neck and head portions are therefore coaxially disposed on the spacing post 70. The shoulder 70C similarly provides a symmetrical annular surface on which the material of disc 50 immediately adjacent a keyhole slot can seat on that shoulder 70C.

When the flange disc 50 is to be assembled on the reel, the several keyholes of the keyhole slots in the 54-series shown in FIGURE 3 will be very easily and quickly shifted by hand until two of the holes of the series of keyhole slots 54 will find and seat over the guide heads 70D of the spacing posts 70. The flange disc 50 will then seat on the shoulders 70C of the several spacing posts 70 on the several tabs of the 32-series of disc 30.

When placing the flange disc 50 in position to be assembled on the reel, the keyhole slot 54C, which will generally be identified by a symbol on the disc directing attention thereto, should be held in appropriate position to seat on the spacing post 80 that is also to serve as a locking pin, as shown near the bottom of FIGURE 4.

The combination spacing post and locking pin 80, as shown in FIGURE 4, compriss a cylindrical plug 80–1 which is arranged to be anchored to its supporting tab 32C of FIGURE 2 in a manner similar to that shown for anchoring the spacing post 70 in FIGURE 4. The post 80 further comprises a hollow cylinder 80–2 which is arranged to fit snugly over the plug 80–1. The front end of the cylinder 80–2 is provided with a central bore 80–3 with an internal shoulder 80–4 to accommodate and to limit the movement of a plug button 80–5 that is normally biased to raised or forward position by a compression spring 80–6 disposed between the top or front surface of the plug 80–1 and the back surface of the button 80–5.

When the front or removable flange disc 50 is to be fitted onto the hub 42 and the spacing posts 70, the disc 50 is first positioned so the keyhole slot 54C will fit onto the locking button 80–5 of the positioning post 80, so the enlarged hole 54C–1 at the end of the narrow slot associated with the keyhole 54C will be fitted over the locking button 80–5 to hold the flange disc 50 against casual unintended turning that might permit that flange disc to become disconnected from its associated reel structure.

Figure 3B:
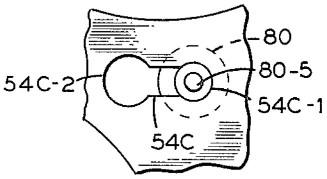
FIGURES 3A and 3B are detailed views of a portion of the annular disc of FIGURE 3 showing a lock button in its engaged and lock positions, respectively.
Figure 3A:
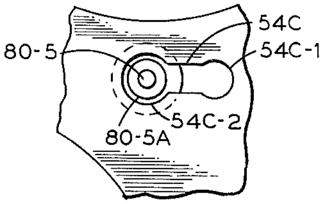

The manner in which the lock button functions to hold the flange disc 50 will be better appreciated upon referring to FIGURES 3A and 3B.

When flange disc 50 is positioned with the respective holes of the keyhole slots to fit over the heads 70D of the respective spacing posts in the 70-series, the large keyhole 54C–2 of keyhole slot 54C, FIGURE 3B, will readily fit over the locking button 80–5, FIGURES 3A and 4. The disc 50 could then be turned through a small angle to pass the narrow slots of the keyhole slots past the necks 70B of the respective spacing posts in the 70-series and under the heads 70D of those posts, were it not for the fact that the shank or body 80–5A of the locking button 80–5, FIGURE 3A, is of larger diameter than the width of the slot 54C. Consequently, the disc 50 cannot be turned through the small angle to pass the narrow part of each slot under the head of each of the spacing posts until and unless the lock button 80–5 is depressed to permit the narrow slot 54C to pass over the top of the shank or body 80–5A.

When the lock button 80–5 is thus depressed, the flange disc 50 can then be rotated or moved through its small angle to place the narrow slots of the respective keyhole slot combinations under the heads of the associated spacing posts 70, and at the same time to shift the locking keyhole slot 54C to a position at which its enlarged hole 54C–1 as shown to FIGURE 3A will be concentric with the locking button 80–5 in the manner shown in FIGURE 3B. Upon release of the locking button 80–5 by the operator who is assembling the reel, the biassing spring will force the button 80–5 into the larger hole 54C–1, as in FIGURES 3A and 3B, and will serve to lock the disc 50 against any angular movement, unless and until such locking button is again depressed to permit such disc 50 to be shifted from such locking position.

By means of the construction herein illustrated, a reel for accumulating and winding a tape may be easily assembled or disassembled.

Since the purpose of disassembling the reel and the removing of the disc 50 will be to achieve access to the wound accumulated tape, normally for the purpose of removing that tape as a wound roll, another feature has been included in the invention to enable such wound coil of tape to be easily and readily removed.

Upon referring back to FIGURE 2, it will be seen that the tabs in the 32-series are so formed with the related neck portions 33 as to provide a certain amount of resiliency to each tab with respect to that neck portion. Thus, it will be realized that the spacing posts 70 that are anchored on those tabs in the 32-series are resiliently supported and are free to be tilted slightly from their normal position which would be perpendicular to the plane of the disc 30 from which the tabs 32 are pressed out. The removable disc 50 is formed in such a way that when it is first fitted onto the spacing posts 70, the narrow slot portions of the keyhole slots in the 54-series are positioned at such a distance from the central axis of the reel that the slot side closer to the axis of the reel will be a short distance farther away from such axis than the surface of the neck of any of the spacing posts 70. Consequently, when those keyhole slots are moved home to locking position, each spacing posts 70 will be tilted slightly around its base of support on its tab. The circular locus of the outer peripheral edges of the spacing posts 70 will then have a slightly larger diameter than the normal circular locus of those peripheral edges of the posts when the posts are in their usual position and not tilted.

When the removable disc 50 is subsequently removed to permit access to the accumulated tape, the removal of the disc 50 will permit the spacing posts 70 to resume their position closer to the axis of the reel, thereby providing a looser fit of the tape on the positioning posts 70, and thereby permitting the accumulated tape to be more easily and readily removed, since the friction between the inner convolution of the tape and the posts will have been relieved.

In order to provide for greater versatility and flexibility in the handling of the reel, with or without the tape, a driving clutch mount for the reel is provided to permit simple and easy clutching and de-clutching between the reel and its driving mount that is connecting to the drive shaft for the reel.

In the vertical sectional view of FIGURE 5, the clutch mount 101 for the reel 22 or 24 of FIGURE 1 is shown as comprising a coupling shaft 104 having a shaft extension 106 with a threaded shank 108 and a terminal stop 110 whose function will be explained below. The coupling shaft 104 is to be suitably joined to a main drive shaft of the mechanism with which the reel is to be used.

The shaft extension 106 serves to support a relatively symmetrical concentric hub 112 which is arranged to be keyed or locked to the shaft extension 106 by means of a lock screw 114 which is normally disposed during assembly to permit the lock screw 114 to be threaded into a key slot 116 in the surface of the shaft extension 106. As shown in FIGURE 5, the hub 112 is provided with an access passage 118 to permit the lock screw 114 to be appropriately positioned in a threaded passage 120 in the hub 112, to reach key slot 116. The hub 112 is also provided with a peripheral flange 124 to serve as a pressure reaction element for two O-rings 132 and 134.

The hub 112, when thus secured to its supporting shaft extension 106, serves as a support for the two O-rings 132 and 134 separated by a spacer and pressure ring 136. The O-ring 132 is positioned to rest normally against the adjacent surface of the flange 124 on the hub 112.

The two O-rings 132 and 134 and the pressure ring 136 are provided with internal diameters that are just a few thousandths of an inch, for example five thousandths of an inch (0.005), larger than the external diameter of the peripheral seat of the hub 112, to permit easy slip fits.

In the functioning of this device 101 as a clutch, the natural resilience of the two O-rings 132 and 134 is utilized, to provide two functions.

First, pressure on the O-rings will distort them to enlarge their external diameters sufficiently to engage the inner surface of the hub of a supported reel 22 to provide a frictional coupling between the clutch hub 112 and the reel hub, so that driving power can be imparted to the reel through the O-rings between the hubs.

The second function of the O-rings is to utilize their natural resilience and tendency to resume their normal dimensions, when the pressure on the two O-rings is released. The resumption of normal dimensions of the two O-rings removes the frictional pressure against the hub of the reel, and permits the entire reel, with or without the tape accumulated thereon, to be readily removed from the clutch 101. Similarly, the reel may be easily and readily positioned on the clutch, and frictional coupling established when desired, as will be explained now in describing the other elements of the clutch device 101.

In order to apply pressure on the O-rings, a pressure ring 140, in the form of an annulus, is concentrically disposed to slide on the shaft extension 106. The pressure ring 140 is provided with a narrow peripheral pressure annulus 144 which is disposed to engage the O-ring 134 to apply pressure to the two O-rings and the spacer ring between them. The pressure annulus 144 has an internal diameter appropriately larger than the external diameter of the hub body 112 to permit the pressure annulus 144 to move freely over the hub 112 in applying pressure to the O-ring assembly and in withdrawing to release such pressure.

The clutch 101 further comprises a thrust bearing 150 which is concentrically and coaxially disposed within a pocket 152 in the rear surface of the pressure ring 140. The bearing 150 is suitably secured to the pressure ring 140 as by means of a press-fitted cap 154 which may be the usual basket for holding the two races of the bearing together.

The clutch 101 further comprises an operating knob 160 by means of which pressure is applied to the O-rings by clock-wise rotation of the knob, to couple the reel to the drive shaft, or by means of which pressure is withdrawn from the O-rings in order to loosen the friction coupling to the reel so the reel may be easily removed from the coupling mount 101.

The knob 160 is shown as comprising an internal hub 162 having a coaxial bore 164 that is threaded to receive the threaded shank 108 of the shaft extension 106. The bore 164 extends into a pocket 166 in the hub of the knob to receive the terminal stop 110, at the end of the shaft extension 106, previously referred to, to serve as a stop to limit the forward axial movement of the knob 160 in its forward movement to compress the two O-rings 132 and 134. Thus, the forward movement of the knob 160, in establishing compression of the O-rings, is limited to a definite amount which is always the same and sufficient to compress the two O-rings 132 and 134 so they can accomplish their function, but without being subjected to excessive pressure beyond the amount necessary.

Pressure is impressed on the two O-rings by the knob 160 by engagement of the front face 162A of the hub 162 against the adjacent race of the bearing 150.

When pressure on the O-rings is to be relieved, in order to release the reel from the clutch 101, the knob 160 is rotated backwardly, by a counter-clockwise movement, to relieve the pressure on the bearing 150, whereupon the natural resiliency of the two O-rings 132 and 134 causes them to resume their normal shape and to disengage the inner surface of the hub of a reel on the mount.

In order to limit the backward movement of the knob 160, when it is rotated to release the pressure on the O-rings, a backward stop 170 is provided in the hub 162 of the knob 160. The stop 170 is suitably anchored in the wall of the hub 162, for which purpose access is made available through a hole 172 in the outer apron of the knob 160. The front end of the stop 170 extends into an undercut portion 175 of the end of the threaded shank 108 of the shaft extension 106, directly behind the terminal stop 110 at the end of that shaft extension 106. The length of the undercut 175 along the shank 176 is appropriately sufficient to permit the operating movement axially of the knob 160 in moving from pressure position to relieving position with respect to the O-rings.

Figure 5:
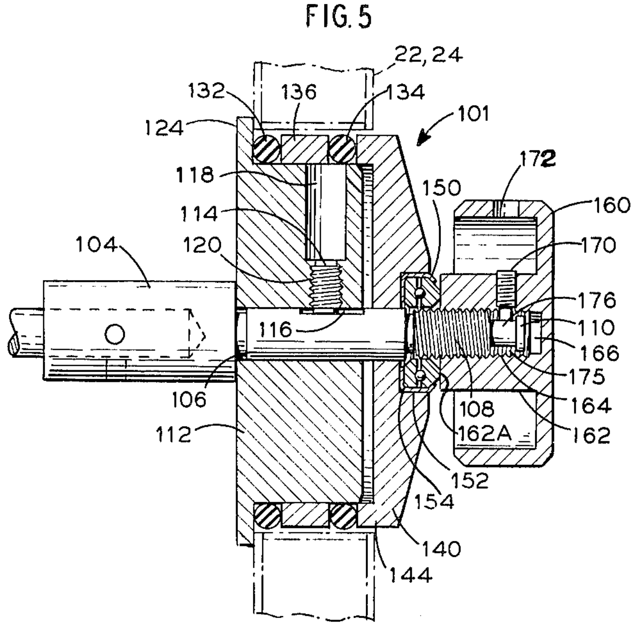
FIGURE 5 is a vertical sectional view of the clutch to clamp the reel to the driving shaft, and shows the clutch in non-clutching position.

By means of the coupling illustrated in FIGURE 5, a tape reel may be quickly assembled on the clutch mount 101 and coupled to the drive shaft 104 by a simple turn of the knob 160.

Inversely, when the reel is to be removed, either empty or when loaded with tape, a simple counter-clockwise movement of the knob 160 is sufficient to relieve the pressure on the O-rings and to remove the friction coupling against the reel, so that the reel may be readily removed from the hub of the clutch mount 101.

FIGURE 5 shows the small amount of clearance between the reel and the O-rings when no pressure is exerted on the O-rings, the actual spacing being exaggerated for clarity of illustration.

Figure 6:
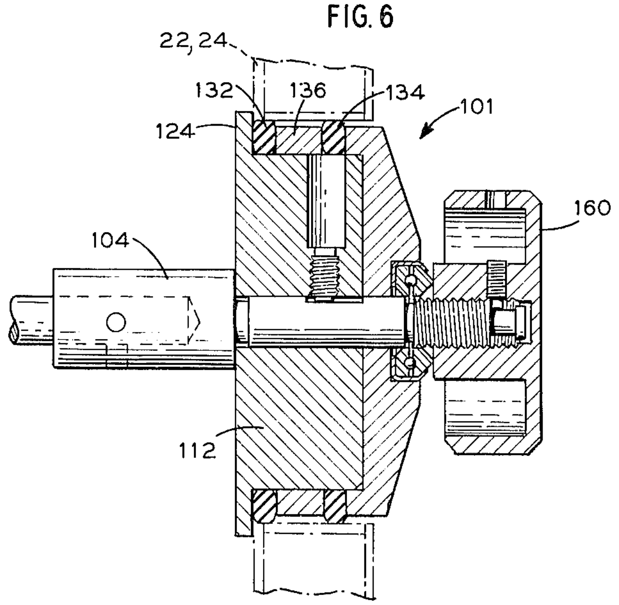
FIGURE 6 is a view similar to FIGURE 5 with the clutch compressed to gripping position to force the O-rings to frictionally engage the reel.

In FIGURE 6, the distortion of the O-rings is shown, to illustrate the manner in which their outer diameters are expanded beyond the dimension of the inner diameter of the hub of the reel which is to be coupled to the drive shaft through the clutch mount 101.

Thus, by means of the construction of the reel as shown, and the construction of the clutch mount as a coupling, as shown, maximum flexibility is achieved in the placement of a reel, either empty or full, onto the clutch mount for coupling to the drive shaft, and the reel may be then disassembled, if desired, to permit the tape alone to be removed, or the clutch coupling itself may be quickly adjusted to disengaging position to permit the reel, either as an empty reel or as a full reel, to be removed from the clutch mount 101.

Also, by means of the construction shown and described, a split reel is provided that may be easily and readily assembled for use, and then easily and readily opened for access to the tape that has been accumulated in order to permit removal of the tape as an accumulated and wound roll.

The invention is not necessarily limited to the details of construction as they are illustrated herein, since modifications might readily be made without changing the functions or without departing from the spirit and scope of the invention as otherwise set forth in the claims.

What is claimed is:

1. A tape-collecting reel comprising a hub member including first and second ends, a first disc member secured to the first end of said hub member, a plurality of resilient means included in said first disc member on the locus of a closed curve, a plurality of spacer posts for supporting tape wound on said collecting reel, each of said spacer posts fixed to one of said resilient means respectively and extending axially toward the second end of said hub member, and a second disc member, said second disc member including means for engaging said spacer posts and for causing the latter to tilt radially outwardly during engagement.

2. A tape-collecting reel, as in claim 1, in which each spacer post has a headed guide pin at the front of said post, with a short neck of reduced diameter below the head, with a height corresponding to the thickness of the second disc member and has a flat seating surface at the lower end of the neck;

and the second disc member has a plurality of key-holes with extension slots to fit over the several guide pin heads to enable the second disc member to seat against the seating surfaces on the spacer posts and to further enable said second disc member to be then angularly turned to move said slots onto said necks in order thereby to lock the key-hole slots under the guide heads, and thereby lock said second disc member in position as a forward wall retainer plate of the reel.

3. A tape-collecting reel, as in claim 2, in which one of said key-hole slots has a slightly enlarged opening at the rear end of the narrow slot;

and one of the guide pin heads is spring-biased and depressable to below its related seating surface to permit the second disc member to be turned to maximum forward lock position, after which said spring-biased guide pin head is forced forward into said slightly enlarged opening to lock the second disc member against angular movement from its locked position so long as said spring-biased guide pin head is in said forward position.

4. A tape-collecting reel, as in claim 2, in which the key-hole extension slots extend tangentially relative to a common circular locus concentric with the hub, and said key-hole slots serve to tilt the guide pin heads of the spacer posts slightly radially outward from normal rest position to a position on a circular locus of larger diameter, so the accumulating tape will be collected on a circular locus of relatively large internal diameter, and such collecting circular locus on the spacer posts can later be reduced when said second disc member is rotated back from locked position and removed from said spacer posts, thereby permitting said spacer posts to resume their original positions defining a circular locus of smaller diameter.

5. A tape-collecting reel comprising a hollow cylindrical hub having an axis;

a first flat annular disc co-axially secured to one end of the cylindrical hub, said disc having a plurality of resilient tabs pressed out of the disc material and spaced apart at points on a circular locus concentric with the axis of the disc;

a plurality of spacing posts, one secured to each tab and extending generally parallel to the hub axis, and the spacing posts being tiltable radially of said hub through the agency of said resilient tabs;

a second flat annular disc to fit onto the front ends of the spacing posts, said second flat annular disc including means for tilting said spacing posts radially outward when said disc is fitted onto the front ends of said spacing posts;

and means for locking said second annular disc to said spacing posts.

6. A tape-collecting reel, as in claim 5, in which said means for tilting said spacing posts radially outward including a plurality of key-holes with extension slots disposed substantially on a circular locus concentric with the axis of the hub;

and the front ends of certain of the spacing posts are provided with shaped guiding head ends with narrow necks joining the head ends of the body of each such spacing post, the length of each such neck being such as to admit the thickness of said second disc as said disc is angularly turned to move each slot extension along said neck and under the related head to be held against direct casual axial separation;

and means on one spacing post for locking said second disc against casual rotation and thereby anchoring the second disc on said spacing posts to provide equalized and balanced support to said second disc.

7. A tape-collecting reel comprising a cylindrical hub, a first annular disc secured to said hub at one end thereof to serve as a back-wall retainer plate for confining collected tape, a plurality of spacer posts anchored on said first annular disc and proecting axially in the direction toward the other end of said hub, each spacer post including a headed guide pin at the front of said post, with a short neck of reduced diameter below the head, said neck having a given height and a flat seating surface at the lower end of the neck, and a second annular disc having a thickness corresponding to said given height, said second annular disc being provided with a plurality of key-holes with extension slots to fit over the several guide pin heads to enable said second annular disc to seat against the seating surfaces on the spacer posts and to further enable said second annular disc to be then angularly turned to move said extension slots onto said necks in order thereby to lock the key-hole slots under the guide heads, and thereby lock said second annular disc in position as a forward wall retainer plate of the reel, one of said key-hole slots having a slightly enlarged opening at the rear end of the extension slot and one of the guide pin heads being spring-biased and depressable to below its related seating surface to permit said second annular disc to be turned to maximum forward lock position, after which said spring-biased guide pin head is forced into said slightly enlarged opening to lock said second annular disc against angular movement from its locked position so long as said spring-biased guide pin head is in said forward position.

8. A tape-collecting reel comprising a cylindrical hub, a first annular disc secured to said hub at one end thereof to serve as a back-wall retainer plate for confining collected tape, said first annular disc including a plurality of resilient tabs pressed out of the body of said disc, a plurality of spacer posts, each of said spacer posts being anchored to one of said tabs and projecting axially in the direction toward the other end of said hub, and a second annular disc removably securable to said spacer posts to serve as a front-wall retainer plate, said second annular disc including means for tilting said spacer posts radially outward when said disc is secured to said spacer posts.

References Cited by the Examiner

UNITED STATES PATENTS

| | | | |
|---|---|---|---|
| 1,866,585 | 7/1932 | Tenney | 242—55 |
| 2,225,921 | 12/1940 | Murdock et al. | 242—55 |
| 2,846,160 | 8/1958 | Thomason | 242—71.8 |
| 2,992,787 | 7/1961 | Craig | 242—68.2 |
| 3,050,270 | 8/1962 | Iikura | 242—71.8 |
| 3,083,927 | 4/1963 | Prosin | 242—68.3 |

MERVIN STEIN, *Primary Examiner.*

DONALD W. PARKER, *Examiner.*